United States Patent [19]
Henson

[11] 4,129,689
[45] Dec. 12, 1978

[54] ELECTRO-CHEMICAL CELLS
[75] Inventor: Kenneth Henson, Ramsbottom, England
[73] Assignee: Unigate Limited, London, England
[21] Appl. No.: 713,153
[22] Filed: Aug. 10, 1976

Related U.S. Application Data
[63] Continuation-in-part of Ser. No. 500,785, Aug. 26, 1974, abandoned.

[30] Foreign Application Priority Data
Aug. 23, 1974 [FR] France .............................. 74 28931

[51] Int. Cl.² ...................... H01M 10/00; H01M 4/96
[52] U.S. Cl. .................................................. 429/101
[58] Field of Search ............................... 429/101, 199

[56] References Cited
U.S. PATENT DOCUMENTS

| | | | |
|---|---|---|---|
| 3,019,141 | 1/1962 | Priebe | 429/199 |
| 3,098,771 | 7/1963 | Huber | 429/199 |
| 3,382,102 | 5/1968 | Zito | 429/199 |
| 3,697,327 | 10/1972 | Croissant et al. | 429/199 |

Primary Examiner—John H. Mack
Assistant Examiner—H. Feeley
Attorney, Agent, or Firm—Sughrue, Rothwell, Mion, Zinn and Macpeak

[57] ABSTRACT

A zinc chloride rechargeable cell or battery comprising a container, at least one cathode element therein comprising a substrate of a metal or mixture of metals selected from Groups IVA and VA of the Periodic Table according to Mendeleef having applied thereto with sufficient pressure to break the metal oxide film thereon and a layer of porous carbon in which chlorine gas is occluded to form a cathode element and which acts as a current collector at least one zinc bearing electrode within said container and a substantially nitrogen free zinc chloride electrolyte on said casing having a pH value of not less than 1.0.

6 Claims, 1 Drawing Figure

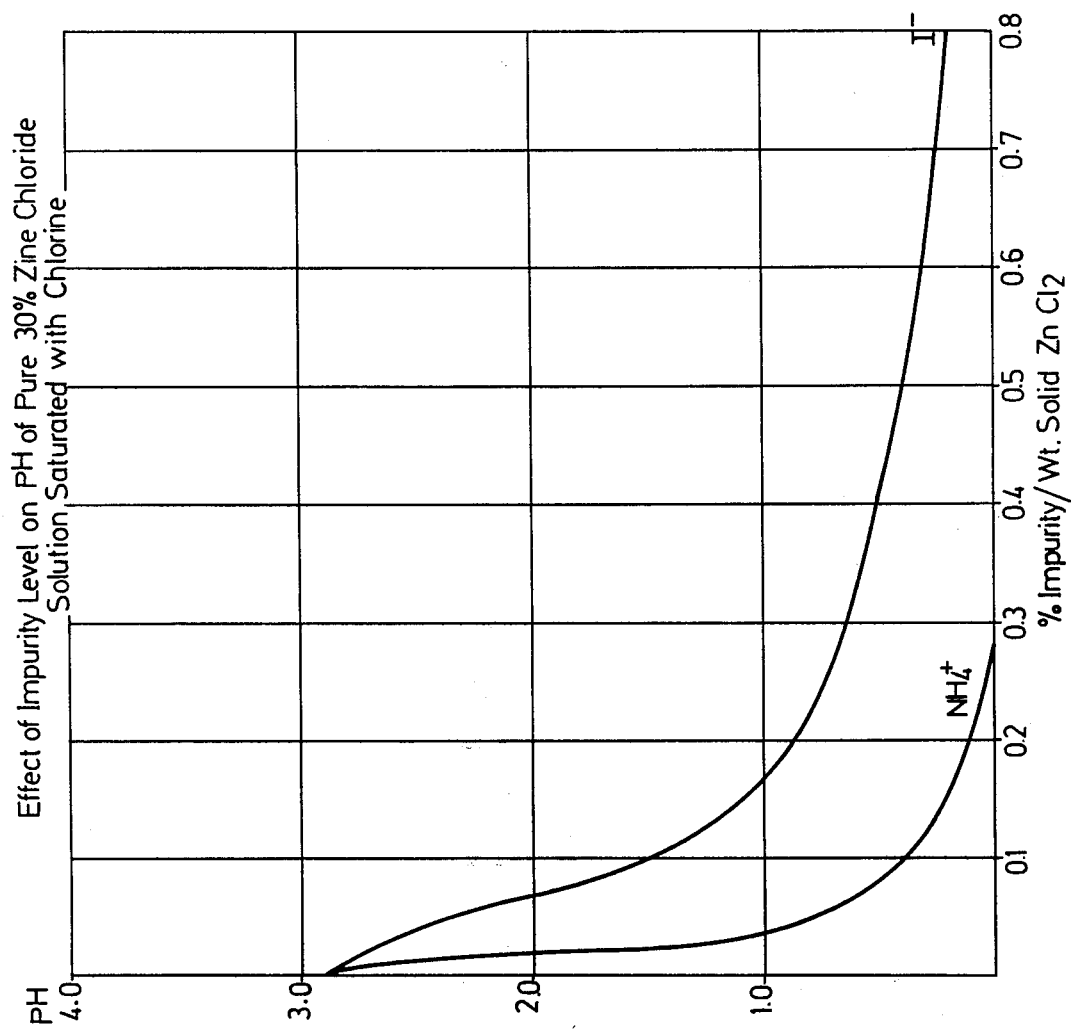

4,129,689

ELECTRO-CHEMICAL CELLS

This application is a continuation in part of Ser. No. 500,785 filed 8/26/74, now abandoned.

BACKGROUND OF THE INVENTION

1. Field of the Invention

This invention relates to electrochemical cells or batteries and more particularly to rechargeable zinc halogen cells or batteries for example to such cells or batteries in which the electrolyte is primarily zinc chloride but may include traces of iodide and/or bromide, and other impurities such as ammonium-ion compounds, or to such cells in which the electrolyte is bromine chloride or iodide chloride.

2. Description of prior art

A zinc halogen rechargeable cell and a battery built up with such cells has been described in United Kingdom patent specification No. 1,258,502 in which the cathode is of porous carbon forming a reservoir for the halogen acting as the cathode, the porous carbon being supported on a metal or mixture of metals of Group IVA or Group VA of the Periodic Table according to Mendeleef which also acts as a connector in the battery electric circuit and the anode is of zinc on a similar metal support which also acts as a connector, the electrolyte being of the halogen zinc salt solution. In such cells and batteries it has been found that using chlorine as the halogen is a suitable form for a number of reasons including the fact that chlorine is the easiest halogen to handle as well as being the least expensive of the three halogens chlorine, iodine and bromine.

It has been found that titanium rapidly acquires a coating of titanium dioxide which is a non-electrical conductor and hence its use in this condition precludes the use of the titanium in a zinc halogen cell which is to be rechargeable.

It has been found that in cells or batteries of this type commercial zinc chloride on the market has tended to lead in use to a rapid change in the pH value of the electrolyte which thus becomes extremely acidic. It has been shown experimentally that the efficiency of zinc plating of the anode falls off sharply at a pH of less than 1.0; also the coulombic efficiency of the cell or battery is adversely affected and the plating quality if unsatisfactory tending to form dendrites which are highly disadvantageous since they disrupt operation of the cell or battery when the cell or battery is rechargeable frequently after discharge. This undesirable tendency is thought to be due to the impurities in the commercial zinc chloride on the market. It is known that ammonium and iodide ions in the electrolyte both produce runaway pH, and bromine ions do so to a lesser extent.

$NH_4^+$ and $I^-$ are detrimental above predetermined limits. Thus the accompanying drawing shows the change in pH values in a Zn Cl cell e.g. the change in pH values in a solution of zinc chloride produced from AnalaR reagents, by the controlled addition of $NH_4^-$ or $I^-$ ions. It can be seen from the drawing that a pH of 1.0 is reached with impurity levels of 0.035% $NH_4^+$ and 0.185% $I^-$. These are regarded as being the maximum impurity levels for satisfactory operation of the zinc-chloride cell or battery. It is known that other nitrogen compounds e.g. chloramine will have the same effect.

The main object of the present invention is to provide a zinc chlorine cell or battery in which these disadvantages are reduced or minimised.

SUMMARY

According to the present invention a zinc-chlorine rechargeable cell or battery comprises a container, at least one cathode element comprising a substrate of a metal or mixture of metals selected from Groups IVA and VA of the Periodic Table according to Mendeleef supporting a layer of porous carbon in which the chlorine gas is occluded to form a cathode element and which acts as a current collector, at least one zinc electrode, and an electrolyte of the zinc chloride having a pH of not less than 1.0. This can be achieved by pure electrolyte material or by complexing that is to say removing the nitrogen as an active species from the solution so that such nitrogen as is present in compounds in the electrolyte will be inactive to the electrolyte and will take no active part in any electrolytic system in the cell. Alternatively the nitrogen can be completely eliminated i.e. liberated from the solution.

The porous carbon may be in the form of lamp black or carbon granules bonded together to form a carbon mass usually in the form of crumb-like material with a synthetic resin binder such as polyvinylchloride or polychloroprene. The optimum particle size carbon depends on providing the highest surface area, but the particles must be coherent naturally as in 50% acetylene black which comprises small particles joined by mechanical strength in chains which bond together or are made more coherent by the application of the binder. When the binder is polychloroprene it preferably has a particle size of between 50m$\mu$ and 190m$\mu$. The carbon mixture may be bonded to the metal substrate by hot pressing or cold pressing the pressure being for example between 2 and 5 tons p.s.i. at temperatures between 15° C and 140° C sufficient to break the titanium oxide coat on the titanium substrate and thus creating permanent electrical contact through the combined substrates and porous carbon.

Moreover, if desired, the cathodic and anodic electrodes are preferably separated by separators. A suitable separator is described in our co-pending U.S. application Ser. No. 500,763 of even date herewith. The carbon plates may be as described in our co-pending U.S. applications Ser. Nos. 500,780 and 500,785. The cathode element including the substrate and the porous carbon layer is resilient imparting a flexibility to the element which not only maintains the pressure between the porous carbon and the substrate but absorbs the differential expansion between the porous carbon and the substrate metal when the chlorine is absorbed into the carbon.

DESCRIPTION OF PREFERRED EMBODIMENT

In a preferred example of the invention the electrolyte was formed by reacting an AnalaR zinc oxide and an AnalaR hydrochloric acid, which provides a zinc chloride electrolyte solution having an $NH_4^+$ and $I^-$ content well below 0.035% and 0.185% respectively. Using such an electrolyte the pH can be maintained in the range of 1.0 to 2.0 which minimises the formation of dendrites and enables the cells and batteries to be charged and discharged over a prolonged period of several months, e.g. 24 months, without any deterioration of the electrodes.

The AnalaR materials referred to in this specification are produced by British Drug Houses Limited of Poole, Dorsetshire, England and are defined in page IV of the July 1968 catalogue of British Drug Houses Limited produced by AnalaR Standards Limited and are defined with their purity in a book entitled "AnalaR Standards for Laboratory Chemicals" published by AnalaR Standards Limited. These materials form a range of high purity chemicals widely used in industry. AnalaR zinc is a zinc which contains the following maximum limits of impurities by weight:

Acid-insoluble matter: 0.05%
Sulphide (S): 0.00001%
Arsenic (As): 0.00001%
Cadmium (Cd): 0.001%
Iron (Fe): 0.002%
Lead (Pb): 0.004%
Substances reducing permanganate (O): 0.0008%

AnalaR hydrochloric acid is an hydraulic acid which contains the following maximum limits of impurities by weight:

Non-volatile matter: 0.0005%
Free chlorine (Cl): 0.0002%
Sulphate ($SO_4$): 0.0002%
Sulphide ($SO_3$): 0.0001%
Ammonium ($NH_4$): 0.0003%
Arsenic (As): 0.000002%
Iron (Fe): 0.00004%
Heavy metals (e.g. Pb): 0.00008%

The porous carbon referred to in this specification is preferably acetylene black which is an amorphous carbon of finely divided form marketed by Shawinigan Company of Shawinigan, Michigan, United States of America mixed with a binder inert to the cell container material or to the electrolyte or the cathode support and anode materials, to form a crumb-like highly porous carbon having of its volume about 50% voids.

I claim:

1. A zinc chloride rechargeable cell comprising a container, at least one cathode element therein comprising a substate of a metal or mixture of metals selected from Groups IVA and VA of the Periodic Table according to Mendeleef having had applied thereto a layer of porous carbon with sufficient pressure to break the oxide film present on said metal or mixture of metals and to form permanent electrical contact between said carbon and said metal or mixture, wherein said layer of porous carbon occludes chlorine gas to form said cathode element and said substrate acts as a current collector, at least one zinc bearing electrode within said container and a substantially nitrogen free zinc chloride electrolyte in said casing having a pH value of not less than 1.0.

2. A zinc chloride rechargeable cell according to claim 1 wherein said electrolyte is pure zinc chloride solution.

3. A zinc chloride rechargeable cell according to claim 1 wherein said electrolyte is maintained at a pH value of not less than 1.0 by complexing any nitrogen contained therein so that said nitrogen takes no active part in any electrolytic system in the cell.

4. A zinc chloride rechargeable cell according to claim 1 wherein said electrolyte is maintained at a pH value of not less than 1.0 by liberating any nitrogen contained therein from the electrolytic solution.

5. A zinc chloride rechargeable cell according to claim 1 wherein the cathodic and anodic electrodes are separated by separators.

6. A zinc chloride rechargeable cell according to claim 1 wherein said electrolyte solution has an $NH_4^+$ and $I^-$ content respectively below 0.035% and 0.185% with a pH value between 1.0 and 2.0.

* * * * *